United States Patent
Bachhuber et al.

[11] Patent Number: 6,087,987
[45] Date of Patent: Jul. 11, 2000

[54] METHOD OF LOCATING AN ENABLING COMPONENT CONTAINING A TRANSPONDER, AND A MOTOR VEHICLE WITH A CORRESPONDING LOCATOR

[75] Inventors: Anton Bachhuber, Langquaid; Thomas Röhrl, Barbing, both of Germany

[73] Assignee: Siemens Aktiengesellschaft, Munich, Germany

[21] Appl. No.: 09/145,479

[22] Filed: Sep. 2, 1998

[30] Foreign Application Priority Data

Sep. 2, 1997 [DE] Germany .................. 197 38 323

[51] Int. Cl.[7] .................................................. G01S 3/02
[52] U.S. Cl. .................. 342/457; 342/463; 340/825.72; 307/10.5
[58] Field of Search ...................... 342/457, 463; 307/10.1–10.6; 340/825.72, 825.65

[56] References Cited

U.S. PATENT DOCUMENTS

| | | | |
|---|---|---|---|
| 5,552,641 | 9/1996 | Fischer et al. | 307/10.5 |
| 5,723,911 | 3/1998 | Glehr | 307/10.2 |
| 5,751,073 | 5/1998 | Ross | 307/10.5 |
| 5,751,973 | 5/1998 | Hassett | 395/213 |
| 5,914,671 | 6/1999 | Tuttle | 340/825.54 |

FOREIGN PATENT DOCUMENTS

| | | |
|---|---|---|
| 0065650A1 | 12/1982 | European Pat. Off. . |
| 4123654A1 | 1/1993 | Germany . |
| 4240426A1 | 6/1994 | Germany . |

*Primary Examiner*—Thomas H. Tarcza
*Assistant Examiner*—Dao L. Phan
*Attorney, Agent, or Firm*—Herbert L. Lerner; Laurence A. Greenberg; Werner H. Stemer

[57] ABSTRACT

The system allows locating an enabling component of a motor vehicle. The enabling component, provided with a chip, is for example a smart card or an electronic key. The enabling component is addressed with a search signal from a transmitter fixed to the vehicle. The enabling component responds with an indicating signal. The indicating signal may be an audible signal emitted by the enabling component itself and/or the location information can be indicated by an indicator device fixed to the vehicle.

2 Claims, 1 Drawing Sheet

METHOD OF LOCATING AN ENABLING COMPONENT CONTAINING A TRANSPONDER, AND A MOTOR VEHICLE WITH A CORRESPONDING LOCATOR

BACKGROUND OF THE INVENTION

Field of the Invention

The invention lies in the automotive art. More particularly, the invention relates to a method of locating an enabling component containing a transponder for a vehicle and to a motor vehicle with a device for locating an enabling component containing a transponder.

Keyless entry systems for motor vehicles are gaining in significance. This is not only for reasons of convenience, but they also increase security against theft. Keyless entry systems include an enabling component which replaces the previously conventional car key. The enabling component contains a transponder which, upon receiving a request signal transmitted by a transmitter in the vehicle, transmits an encoded signal with vehicle-specific and/or user-specific information. Upon receiving the encoded signal by the vehicle-side receiver, the signal is evaluated and the vehicle is enabled for operation.

German published non-prosecuted patent application DE 41 23 654 A1 discloses a system with two antennas disposed in the rear-view mirrors and with associated transmitting/receiving units. The system locates and determines whether the enabling component is located outside the vehicle when a request to lock the vehicle is received. The system thus ensures that the vehicle is locked when the enabling component is located inside the vehicle.

One problem that occurs in the context of keyless entry systems is that the driver, or another person holding the enabling component, loses the reference to the current location of the enabling component. The enabling component, which may be a "smart card", specifically only has to be brought somewhere into the starting enabling region of the vehicle in order that the vehicle can be put into operation without a key or the like, merely via the operating elements on the dashboard. If the driver subsequently wishes to leave the vehicle, she must first search for the enabling component. This may be quite tedious and, if any, there is usually very little time for such a search.

German published non-prosecuted patent application DE 42 40 426 A1 discloses a motor vehicle with an electronic access control system that operates with a dialog between the vehicle and an enabling component carried by an individual. The enabling component contains a transponder. In order that the enabling component does not inadvertently remain in the vehicle, for example when the door is closed with the central lock actuated, a dialog commences between at least one transmitter/receiver in the vehicle and the enabling component after the door has been closed. A search signal transmitted by the transmitter/receiver is received by the enabling component only if it is located inside the vehicle. The enabling component then sends a response signal from which a logic system connected downstream of the transmitter/receiver concludes that the enabling component is located in the vehicle, and unlocks the central locking for a predetermined time period and generates an acoustic warning signal. The exact location at which the enabling component is to be located is not described in the publication.

SUMMARY OF THE INVENTION

It is accordingly an object of the invention to provide a method for locating an enabling component carrying a transponder and a motor vehicle with a device for locating the enabling component, which overcomes the above-mentioned disadvantages of the heretofore-known devices and methods of this general type and which ensures that a driver or vehicle occupant will always find the enabling component for actuating a keyless access control system of the vehicle.

With the foregoing and other objects in view there is provided, in accordance with the invention, a method of locating an enabling component of a motor vehicle, which comprises:

exchanging information between a transmitter/receiver fixed to a motor vehicle and a transponder disposed on an enabling component of the motor vehicle, and obtaining location information about a location of the enabling component; and indicating the location of the enabling component.

In other words, specific location information is obtained from signals passing between the transmitter/receiver and the enabling component, and the location information is indicated by an indicator device. The indicator device may be fixed to the vehicle. The indication may be, for example, be a graphic display of the location of the enabling component relative to the vehicle interior. The indicator device may also be a constituent part of the enabling component and then indicates, for example, the location of the enabling component by means of an appropriately coded acoustic signal. For example, if the enabling component is located in the left front region of the vehicle interior, this is indicated by a sequence of single beeps in each case. If it is found in the right front interior, this is indicated by a sequence of double beeps, etc.

The location information can be obtained in a wide variety of ways, for example by measuring the propagation time or the propagation time differences between signals which pass from the transmitters/receivers to the enabling component or vice versa. The locator system may be activated by a search key (a push button or the like) on the switch panel or, as a routine, during operational processes, whereby a search signal is sent by one of the transmitter/receivers to the transponder belonging to the enabling component.

In accordance with an added feature of the invention, at least two mutually spaced-apart transmitter/receivers are provided, and the step of obtaining location information comprises ascertaining the location information from a difference between received intensities of signals transmitted to the enabling component by the two mutually spaced-apart transmitter/receivers. Alternatively, the location information is ascertained from a difference between received intensities of a signal transmitted from the enabling component to the two mutually spaced-apart transmitter/receivers.

With the above and other objects in view there is also provided method of locating an enabling component for a motor vehicle, which comprises: generating a search signal with a transmitter fixed to a motor vehicle, and, upon receiving the search signal by the enabling component, generating an indicating signal that is perceivable by a person. In other words, the enabling component, upon receiving a search signal which is transmitted as a result of the actuation of a search key in the switch panel or otherwise, routinely during operational processes, for example when the door is opened, generates an indicating signal which can be perceived directly by a person, for example acoustically and/or optically, in the form of vibrations or otherwise. In this way, the driver is able to locate the enabling component directly.

With the above and other objects in view there is also provided, in accordance with the invention, a motor vehicle with a device for locating its enabling component, which contains a transponder. The system comprises:

at least two mutually spaced-apart transmitter/receivers disposed at predetermined points in an interior of the motor vehicle;

an evaluation device for obtaining location information about a location of the enabling component from signals exchanged between the enabling component and the transmitter/receivers;

the evaluation device being adapted to process one of propagation time differences and field strength differences between the signals in calculating the location information indicating a location of the enabling component relative to the transmitter/receivers; and an indicator device for indicating the position of the enabling component.

As noted above, the indicator device may be fixedly mounted in the vehicle. Preferably, the indicator device contains a display. In the alternative, the indicator device is disposed on the enabling component.

In accordance with a concomitant feature of the invention, there are provided at least three mutually spaced-apart transmitter/receivers disposed at defined points in an interior of the motor vehicle. This embodiment achieves a high degree of accuracy with regard to the location information. The accuracy may be increased further by increasing the number of transmitters/receivers.

Other features which are considered as characteristic for the invention are set forth in the appended claims.

Although the invention is illustrated and described herein as embodied in a method for, and motor vehicle with a device for, locating an enabling component containing a transponder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
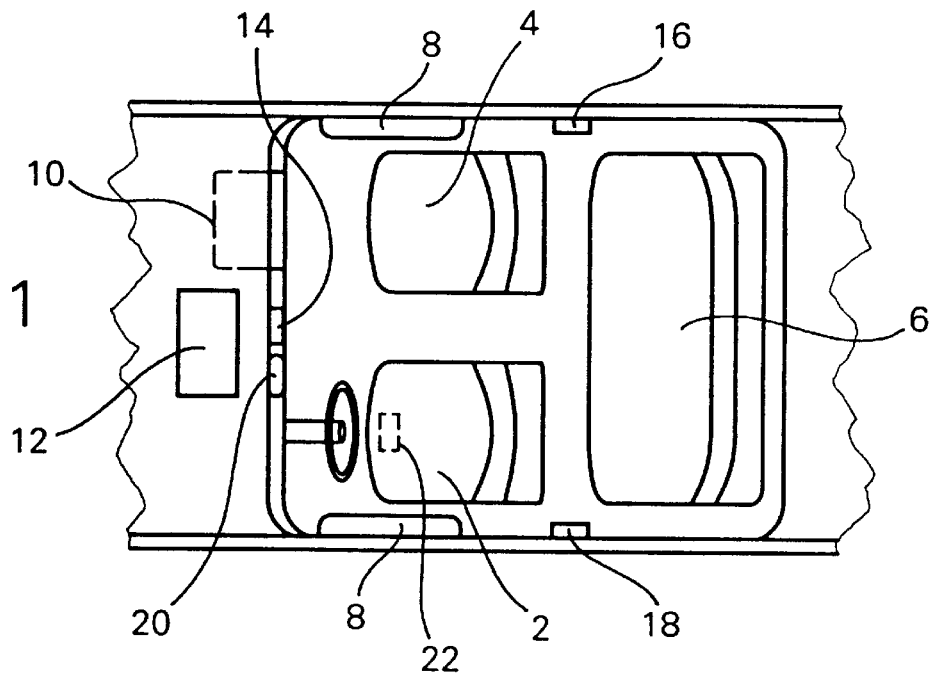
FIG. 1 is a schematic, partial plan view of a vehicle interior.

Referring now to the figures of the drawing in detail and first, particularly, to FIG. 1 thereof, there is seen a vehicle interior with two front seats 2 and 4, a rear bench seat 6, side pockets 8 in the doors, and a glove compartment 10. In addition, the vehicle contains a controller 12 with a microcomputer, a transmitter/receiver 14 in the switch panel, and a transmitter/receiver 16 and 18 each in the right-hand and left-hand B column. Conventional operating elements are contained in the switch panel and they are, accordingly, not separately identified. Furthermore, the switch panel also has a display 20 which may be an LCD display, a monitor screen, or the like.

The vehicle is equipped with a keyless access and enabling system, the central constituent part of which is a so-called smart card.

Figure 2:
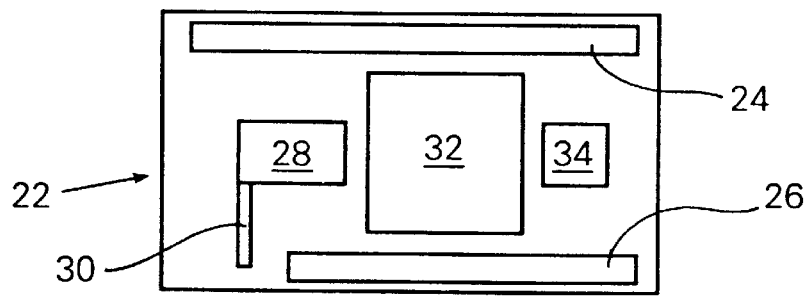
FIG. 2 is a diagrammatic plan view of an enabling component.

One embodiment of the smart card is illustrated in FIG. 2. The smart card, which forms an enabling component 22 for the vehicle, contains a segment 24 for encoded information, for instance vehicle-specific data; a segment 26 for clear text inscriptions; a semiconductor module 28 having an antenna 30; a power supply 32; and a device 34 for generating an acoustic, audible signal. The audible signal may be produced with of membrane that can vibrate at audible frequencies.

Operating the vehicle by means of the smart card is known per se and will therefore not be specifically explained. Assume, for instance, that the smart card is located anywhere in the interior of the vehicle space, and the vehicle is to be started with the aid of a starter motor. The transmitter/receiver 14 emits an encoded signal, which the smart card receives since it is located within the transmitting region of the transmitter/receiver 14. The transmitting region thus forms the starting enabling region. After receiving the signal, the semiconductor module 28 responds with an encoded signal which contains vehicle-specific and/or user-specific information. The response signal is received by the receiver 14 and is compared in the controller 12 with vehicle-specific information contained therein. In the case of a positive comparison, the engine is then started and the vehicle can be put into operation. In the case of a negative outcome of the comparison, the starter-motor circuit and/or an engine control system are blocked.

The semiconductor module 28 thus has at least the function of a transponder. It is advantageously constructed as a microchip with a processor and associated memory modules, whose computing and memory capacity corresponds to the respective requirements.

If the card or the enabling component 22 is misplaced anywhere in the vehicle interior, for example, as indicated in FIG. 1, under the driver's seat, the driver will be hard pressed to find the enabling component, for example before leaving the vehicle.

The enabling component can be relatively easily found, however, when the driver actuates a "search" knob on the switch panel. The transmitter/receiver 14 then transmits a search signal, which is recognized by the semiconductor module 28. Upon receiving the signal, the semiconductor module 28 transmits via its antenna 30 an encoded identification signal, which is received by the transmitter/receivers 14, 16 and 18. The differences between the amplitudes or field strengths of the signals received by the transmitter/receivers 14, 16 and 18 are registered in the controller 12. In the case of identical, nondirectional antenna characteristics of the transmitter/receivers 14, 16 and 18, the received powers decrease quadratically with the distance from the enabling component 22. The result is that the position of the enabling component can be calculated in the controller 12. The calculated position is then indicated in the display 20 within a picture representing the vehicle interior.

Alternatively, or in addition, it is also possible to indicate the position of the enabling component by emitting an audible signal in response to the search signal. In the preferred embodiment, the position calculated in the controller 12 can be converted into an encoded signal which, for example, is transmitted from the transmitting/receiving unit 14 to the enabling component 22, and is emitted acoustically there by the device 34 as an encoded signal. The encoding may reside, for example, in the frequency of the emitted sound or in the sequence of emitted sound. The codes may thereby be indicated on the display 20. For example, a single-cycle sequence of sounds signifies that the enabling component 22 is in the region of the driver's seat. A double sequence of sounds signifies that the enabling component is in the region of the passenger's seat, and so on.

It will be understood by those who are skilled in the pertinent art that numerous modifications of the above-described embodiments are possible, above all with regard to the software used and also with regard to the hardware:

For example, the power differences between the signals can also be evaluated in such a way that, in the semiconductor module 28, the power differences between signals which are encoded but emitted at the same power from the transmitter/receivers 14, 16 and 18 are evaluated and converted into location information.

Alternatively, it is also possible to evaluate propagation time differences of signals which are transmitted by the enabling component 22 to the three transmitter/receivers.

In a simplified embodiment, the vehicle has only one transmitting/receiving unit 14, which transmits a search signal, which is recognized by the semiconductor module 28 and upon receipt of which the device 34 emits an acoustic signal. Although this acoustic signal does not contain any direct location information, it serves for the driver to locate and to find the enabling component 22.

The location-unspecific indicating signal emitted by the enabling component can also be generated in addition to the specific location information indicated by the display fixed to the vehicle.

In embodiments in which the location information is indicated by the vehicle, be it by a sound source of the vehicle, be it by the display 20, it is possible to configure the system without a separate power supply 32 and without the device 34 for generating the acoustic signal on the enabling component 22. The power supply is then integrated into the semiconductor module 28, or the power is obtained by extracting power from a carrier signal supplied to the enabling component 22 by the vehicle.

If the system requires a considerable amount of energy of the enabling component 22, there may be provided a charging slot in the switch panel. The enabling component 22 may then be inserted into the slot in order to charge up the power supply 22. Charging may take place directly via contacts or inductively.

The enabling component 22 may be constructed in the form of a key, a card, for example a check card, or otherwise as appropriate for the purpose.

It goes without saying that the functional minimum scope of the semiconductor module 28 corresponds to that of a transponder which recognizes an encoded signal and, after receiving an encoded signal, for its part emits a signal that is encoded in a predetermined way.

The transmitter/receivers 14, 16 and 18 do not necessarily all have to be constructed as transmitter/receivers. For example, if only the receipt of one of the signals transmitted by the enabling component 22 is required for location, it is possible for the transmitter/receivers 16 and 18 to be constructed merely as receivers, which are connected to the controller 12.

As outlined, the information described in its various possible forms about the location of the enabling component 22 is provided in response to a deliberate request by means of an actuating knob in the switch panel or routinely after the engine has been switched off or, likewise routinely, when a vehicle door is opened, or otherwise in any suitable way.

Moreover, it goes without saying that, when the location is being ascertained with the aid of signals transmitted by the transmitter/receivers 14, 16 and 18, these signals are transmitted in encoded form (to recognize the transmitter/receivers) and offset in time. It is possible for an information exchange to take place in a wireless manner between the controller 12 and the semiconductor module 28 of the enabling component 22.

In order to increase sensitivity, the antennas of the transmitter/receivers 14, 16 and 18 may have predetermined directional characteristics, which are taken into account when the location is being calculated in the controller 12 or in the semiconductor module 28. It is also possible for more than three transmitter/receivers to be provided.

Figure 3:
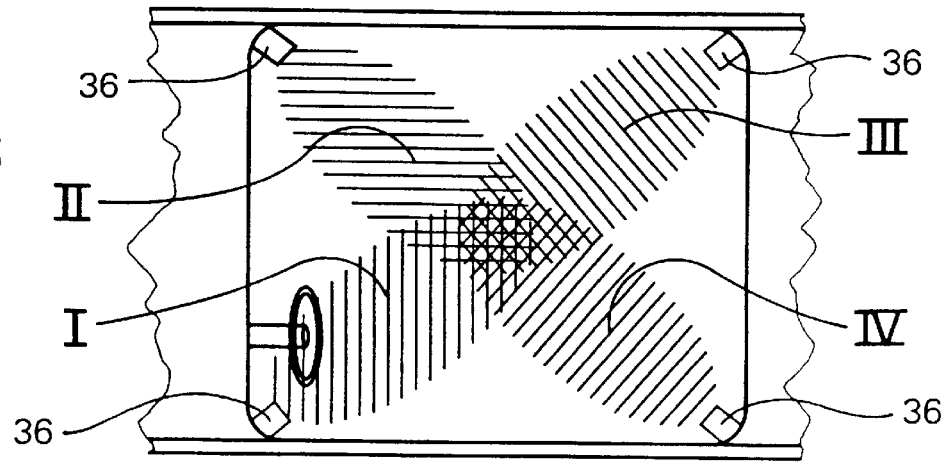
FIG. 3 is a schematic, partial plan view of an arrangement of four antennas which irradiate the vehicle interior.

FIG. 3 shows an exemplary embodiment in which four transmitter/receivers 36 each having a pronounced directional characteristic of its spatial transmitting region are arranged essentially in the corners of the interior. The transmitting region of the transmitter/receiver 36 that is arranged at the left front, as viewed in the direction of travel of the vehicle, is designated by I, the transmitting regions of the other transmitter/receivers are designated by II, III, and IV, respectively.

If the transmitters are operated under the control of the controller 12 in such a way that they transmit, in a time-offset manner, transmitter-specifically encoded signals which are recognized by the enabling component (not illustrated in FIG. 3) and on receipt of which the enabling component responds with a signal which is received by at least one of the appropriately constructed transmitter/receivers 36 or a separate receiver, it is then possible for specific location information to be obtained in the following simple way.

If the enabling component is located in the transmitting region I, it will respond to the encoded signal form the transmitter/receiver 36 located at the left front. If the enabling component is also located in one or more of the transmitting regions II, III or IV, then it responds additionally to the appropriately encoded transmitted signals. In this way, by means of a "digital" response (receipt or no receipt) in one or more of the transmitting regions I to IV, relatively accurate location information can be obtained in a simple way, and can be indicated in the display. If, for example, the enabling component responds to the encoded transmitted signals of all regions I to IV, then it is located within the small region within which all the regions intersect. Again, the transmitter/receivers 36 can in each case be constructed only as a transmitter, and a central receiver can be provided. The regions remaining unhatched in FIG. 3 can be covered by additional transmitters, so that the entire interior is registered. As can be seen directly from FIG. 3, the location information that can be obtained with the method outlined is all the more specific the more transmitters are provided, and the more precisely the interior may be subdivided into individual segments by the overlapping of the individual transmitting regions. In the case of only one transmitter, the only information possible is "enabling component within the transmitting region or enabling component outside the transmitting region of this transmitter."

What is claimed is:

1. A method of locating an enabling component of a motor vehicle, which comprises:

providing at least two mutually spaced-apart transmitter/receivers fixed to a motor vehicle;

providing a transponder disposed on an enabling component of a motor vehicle;

exchanging information between the transponder and each of the two mutually spaced apart transmitter/receivers;

obtaining location information about a location of the enabling component from a difference between received intensities of signals transmitted to the enabling component by the two mutually spaced-apart transmitter/receivers; and indicating the location of the enabling component.

2. A method of locating an enabling component of a motor vehicle, which comprises:

providing at least two mutually spaced-apart transmitter/receivers fixed to a motor vehicle;

providing a transponder disposed on an enabling component of a motor vehicle;

exchanging information between the transponder and each of the two mutually spaced apart transmitter/receivers;

obtaining location information about a location of the enabling component from a difference between received intensities of a signal transmitted from the enabling component to the two mutually spaced-apart transmitter/receivers; and indicating the location of the enabling component.

* * * * *